(12) United States Patent
Horiuchi et al.

(10) Patent No.: US 12,244,971 B2
(45) Date of Patent: Mar. 4, 2025

(54) INFORMATION PROCESSING DEVICE, INFORMATION PROCESSING METHOD AND COMPUTER-READABLE RECORDING MEDIUM

(71) Applicant: EVIDENT CORPORATION, Nagano (JP)

(72) Inventors: Kazuhito Horiuchi, Hachioji (JP); Nobuyuki Watanabe, Yokohama (JP); Yoshioki Kaneko, Hachioji (JP); Hidetoshi Nishimura, Koganei (JP)

(73) Assignee: Evident Corporation, Nagano (JP)

( * ) Notice: Subject to any disclaimer, the term of this patent is extended or adjusted under 35 U.S.C. 154(b) by 625 days.

(21) Appl. No.: 17/361,834

(22) Filed: Jun. 29, 2021

(65) Prior Publication Data

US 2021/0326625 A1 Oct. 21, 2021

Related U.S. Application Data

(63) Continuation of application No. PCT/JP2019/002524, filed on Jan. 25, 2019.

(51) Int. Cl.
*G06V 10/25* (2022.01)
*G06V 20/69* (2022.01)
(Continued)

(52) U.S. Cl.
CPC ............ *H04N 7/183* (2013.01); *G06V 10/25* (2022.01); *G06V 20/69* (2022.01); *H04N 7/18* (2013.01);
(Continued)

(58) Field of Classification Search
CPC .......... H04N 7/183; H04N 7/18; H04N 23/69; H04N 23/60; G06V 10/25; G06V 20/69;
(Continued)

(56) References Cited

U.S. PATENT DOCUMENTS

| 7,593,602 B2 | 9/2009 | Stentiford |
| 8,947,519 B2 | 2/2015 | Tsujimoto |

(Continued)

FOREIGN PATENT DOCUMENTS

| JP | 2013-106870 A | 6/2013 |
| JP | 2013-152454 A | 8/2013 |

(Continued)

OTHER PUBLICATIONS

International Search Report dated Apr. 9, 2019 received in PCT/JP2019/002524.

*Primary Examiner* — Jon Chang
(74) *Attorney, Agent, or Firm* — Scully, Scott, Murphy & Presser, P.C.

(57) ABSTRACT

An information processing device includes: a processor including hardware, the processor being configured to cause a display to display a second image according to an input of an operation, the second image corresponding to a field of view corresponding to at least part of a first image contained in imaging data that is generated by capturing an observation subject, analyze change of the field of view over time to calculate an attention degree, and set a region of interest in the first image contained in the imaging data according to the attention degree.

16 Claims, 12 Drawing Sheets

(51) Int. Cl.
*H04N 7/18* (2006.01)
*H04N 23/69* (2023.01)

(52) U.S. Cl.
CPC ... *H04N 23/69* (2023.01); *G06T 2207/20104* (2013.01)

(58) Field of Classification Search
CPC ...... G06V 2201/03; G06T 2207/20104; G09G 5/36; G02B 21/36
See application file for complete search history.

(56) References Cited

U.S. PATENT DOCUMENTS

| | | |
|---|---|---|
| 2013/0135307 A1 | 5/2013 | Kawasaki |
| 2016/0062101 A1 | 3/2016 | Weiss et al. |
| 2016/0274347 A1* | 9/2016 | Okabe .................. H04N 23/675 |
| 2018/0191952 A1* | 7/2018 | Ardo .................. H04N 21/2662 |

FOREIGN PATENT DOCUMENTS

| | | | |
|---|---|---|---|
| JP | 2013-246187 A | 12/2013 | |
| JP | 2014-044360 A | 3/2014 | |

\* cited by examiner

INFORMATION PROCESSING DEVICE, INFORMATION PROCESSING METHOD AND COMPUTER-READABLE RECORDING MEDIUM

CROSS-REFERENCE TO RELATED APPLICATION

This application is a continuation of International Application No. PCT/JP2019/002524, filed on Jan. 25, 2019, the entire contents of which are incorporated herein by reference.

BACKGROUND

1. Technical Field

The disclosure relates to an information processing device that processes imaging data, an information processing method, and a computer-readable recording medium.

2. Related Art

A technique of sensing a gaze of a user and using a region of interest on which the user has an interest for image searching in an information processing device that searches for a region that the user wants in at least one image or a video has been known (for example, refer to U.S. Pat. No. 7,593,602). The technique enables a user to, using a gaze, input a region of interest to an information processing device and thus make a hands-free input of a region of interest.

SUMMARY

In some embodiments, an information processing device includes: a processor including hardware. The processor being configured to cause a display to display a second image according to an input of an operation, the second image corresponding to a field of view corresponding to at least part of a first image contained in imaging data that is generated by capturing an observation subject, analyze change of the field of view over time to calculate an attention degree, and set a region of interest in the first image contained in the imaging data according to the attention degree.

In some embodiments, provided is an information processing method that is executed by the information processing device. The method includes: displaying a second image on a display according to an input of an operation, the second image corresponding to a field of view corresponding to at least part of a first image contained in imaging data that is generated by capturing an observation subject; analyzing change of the field of view over time to calculate an attention degree; and setting a region of interest in the first image contained in the imaging data according to the attention degree.

In some embodiments, provided is a non-transitory computer-readable recording medium with an executable program stored thereon. The program causes an information processing device to: display a second image on a display according to an input of an operation, the second image corresponding to a field of view corresponding to at least part of a first image contained in imaging data that is generated by capturing an observation subject; analyze change of the field of view over time to calculate an attention degree; and set a region of interest in the first image contained in the imaging data according to the attention degree.

The above and other features, advantages and technical and industrial significance of this disclosure will be better understood by reading the following detailed description of presently preferred embodiments of the disclosure, when considered in connection with the accompanying drawings.

DETAILED DESCRIPTION

Embodiments of an information processing device, an information processing method, and a program according to the disclosure will be described below with reference to the drawings. The embodiments do not limit the disclosure. The disclosure is generally applicable to information processing devices that perform image search using imaging data, information processing methods, and programs.

In the illustration of the drawings, the same or corresponding components are denoted with the same reference numbers. The drawings are schematic and it should be noted that the correlation among components in size and the ratio among the components may differ from actual ones. The drawings may contain components whose correlation in size and whose ratio differ among the drawings.

First Embodiment

Figure 1:
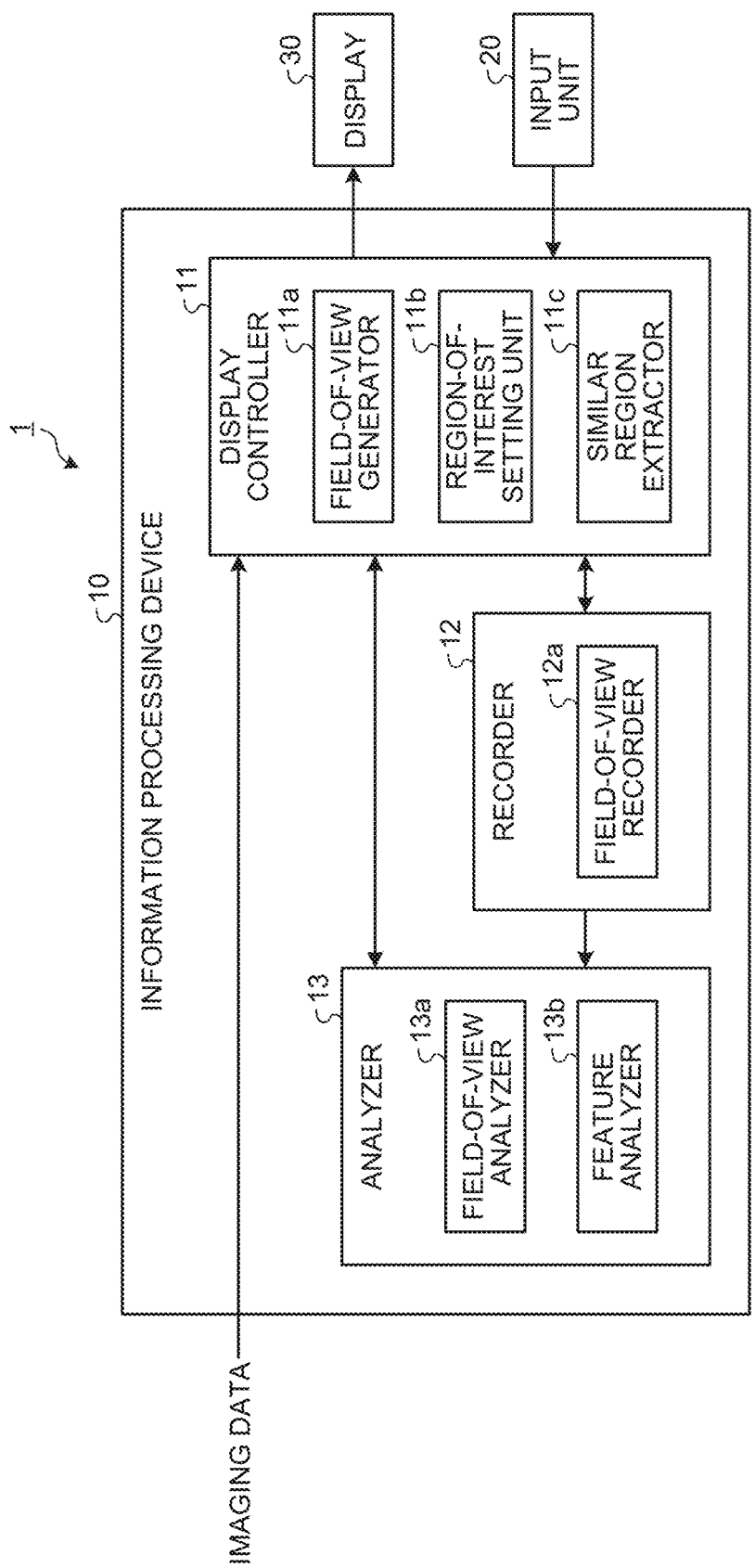
FIG. 1 is a block diagram illustrating a functional configuration of an information processing system according to a first embodiment.

FIG. 1 is a block diagram illustrating a functional configuration of an information processing system according to a first embodiment. An information processing system 1 illustrated in FIG. 1 includes an information processing device 10 that performs various types of processing on imaging data that is input externally, an input unit 20 that receives inputs of operations on various types of information on the information processing device 10, and a display 30 that displays various types of data that are output from the information processing device 10. The information processing device 10, the input unit 20 and the display 30 have wireless or wired connection are connected in a wired or wireless manner.

Configuration of Information Processing Device

First of all, a configuration of the information processing device 10 will be described.

The information processing device 10 illustrated in FIG. 1 is implemented by a program that is installed in, for example, a server or a personal computer and various types of data are input to the information processing device 10 via a network or various types of data that are acquired by an external device are input to the information processing device 10. As illustrated in FIG. 1, the information processing device 10 includes a display controller 11, a recorder 12 and an analyzer 13.

According to an input of an operation on the input unit 20, the display controller 11 outputs, to the display 30, an image corresponding to a field of view corresponding to at least part of an image contained in imaging data that is generated by capturing an observation subject and thus causes the display 30 to display the image. The field of view is determined by absolute coordinates and a magnification and changes over time according to an operation of the user on the input unit 20. Information on the field of view that changes over time is recorded sequentially in the recorder 12.

When the mode of use is WSI (Whole Slide Imaging), the imaging data is one image that is generated by capturing a whole slide sample that is the observation subject. Using part of the image of the whole slide sample as a field of view, the user makes an observation and the field of view changes over time. In this case, the absolute coordinates refer to coordinates presented based on one predetermined point in the image and the magnification refers to a ratio at which the image of the whole slide sample is enlarged.

On the other hand, when the mode of use is an optical microscope, the imaging data is a video that is generated by sequentially recording fields of view in which the user observes part of a slide sample that is an observation subject. In this case, the absolute coordinates refer to coordinates presented based on one predetermined point in the slide sample and the magnification refers to a ratio at which the slide sample is enlarged.

The display controller 11 includes a field-of-view generator 11a, a region-of-interest setting unit 11b, and a similar region extractor 11c. To configure the display controller 11, for example, a central processing unit (CPU), a field programmable gate array (FPGA), a graphics processing unit (GPU), etc., are used.

The field-of-view generator 11a acquires the absolute coordinates and the magnification based on an input of an operation on the input unit 20. Using the acquired absolute coordinates and the magnification, the field-of-view generator 11a generates a field of view from the image contained in the imaging data. The display controller 11 causes the display 30 to display an image corresponding to the generated field of view and records information on the field of view in the recorder 12.

The region-of-interest setting unit 11b sets a region of interest in the image contained in the imaging data according to an attention degree that is calculated by the analyzer 13. Specifically, the region-of-interest setting unit 11b sets, for a region of interest, a region of which attention degree is at or above a threshold.

The similar region extractor 11c extracts a similar region that is similar to the region of interest based on features of the region of interest that is calculated by the analyzer 13. Specifically, the similar region extractor 11c extracts a similar region from the whole image contained in the imaging data, the similar region being a region in which a difference between a feature of the region of interest and a feature of the similar region is at or under a predetermined threshold. The similar region extractor 11c may extract, as a similar region, a region similar to the region of interest from the whole image contained in the imaging data by machine learning using a convolution neural network (CNN).

The recorder 12 includes a field-of-view recorder 12a. The recorder 12 records various programs to be executed by the information processing device 10 and data under processing. To configure the recorder 12, a volatile memory, a non-volatile memory, a recording medium, etc., are used.

The field-of-view recorder 12a records the information on the field of view that is input from the display controller 11 and the attention degree that is calculated by the analyzer 13 in association with each other.

The analyzer 13 includes a field-of-view analyzer 13a and a feature analyzer 13b. To configure the analyzer 13, a CPU, a FPGA, a GPU, etc., are used. The display controller 11 and the analyzer 13 may be configured to implement each function, using any one of the CPU, the FPGA, and the GPU or, needless to say, may be configured to implement each function by a combination of the CPU, the FPGA and the GPU.

The field-of-view analyzer 13a analyzes the change of the field of view over time and calculates the attention degree. The field-of-view analyzer 13a determines that a field of view that the user has observed for a long time has a high attention degree. Specifically, the attention degree increases as a magnification of display of the field of view on the display 30 increases. The attention degree increases as a time of retention of the field of view on the display 30 increases. The attention degree increases as a speed of shift of the field of view on the display 30 decreases.

The feature analyzer 13b calculates a feature based on tissue properties, such as the color and shape of the region of interest.

Configuration of Input Unit

A configuration of the input unit 20 will be described.

To configure the input unit 20, a mouse, a keyboard, a touch panel, and various switches are used. When the mode of use is a microscope, the input unit 20 contains a stage for performing an operation on the position in which the microscope makes an observation and a revolver for switching an objective lens that is arranged on an observation optical path to change the magnification. The input unit 20 receives inputs of various operations performed by the user and outputs operation signals corresponding to the received various operations to the information processing device 10.

Configuration of Display

A configuration of the display 30 will be described.

The display 30 displays the image corresponding to the field of view that is input from the display controller 11 and various types of information. To configure the display 30, for example, an organic electro luminescence (EL) or liquid crystal display monitor is used.

Process Performed by Information Processing Device

Figure 2:
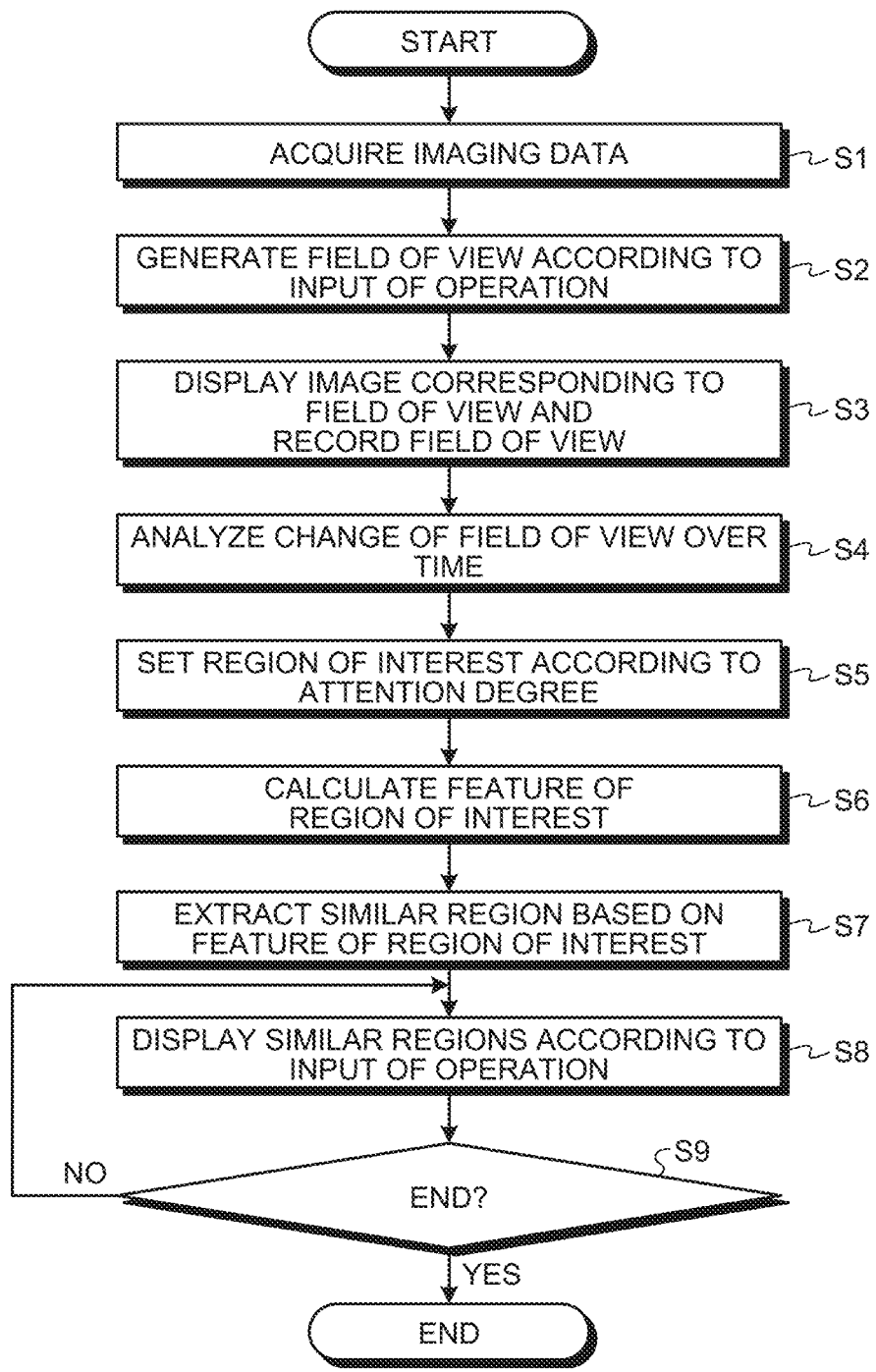
FIG. 2 is a flowchart illustrating an overview of a process that is executed by an information processing device according to the first embodiment.
Figure 3:
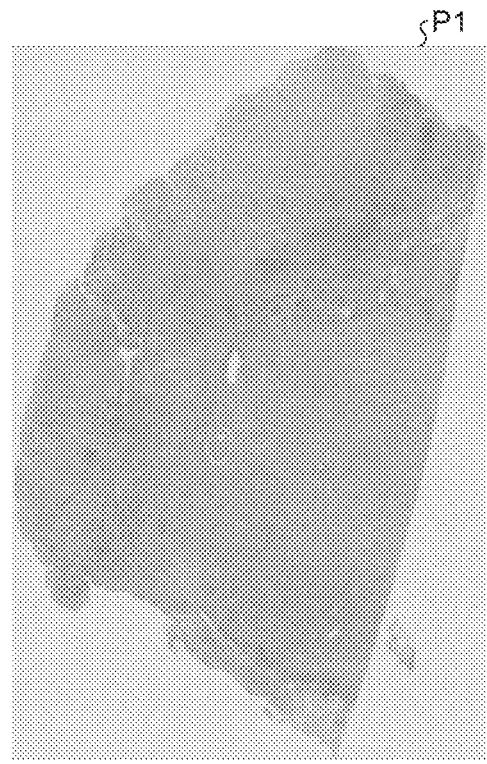
FIG. 3 is a diagram illustrating an example of a captured image of a whole observation subject.

A process performed by the information processing device 10 will be described. FIG. 2 illustrates the process that is executed by the information processing device 10. The case where the mode of use is WSI will be described below. FIG. 3 is a diagram illustrating an example of the image of the whole observation subject. The user observes part of an image P1 illustrated in FIG. 3 by performing an operation on the input unit 20.

As illustrated in FIG. 2, first of all, the information processing device 10 acquires data of the image P1 that is imaging data externally (step S1).

Figure 4:
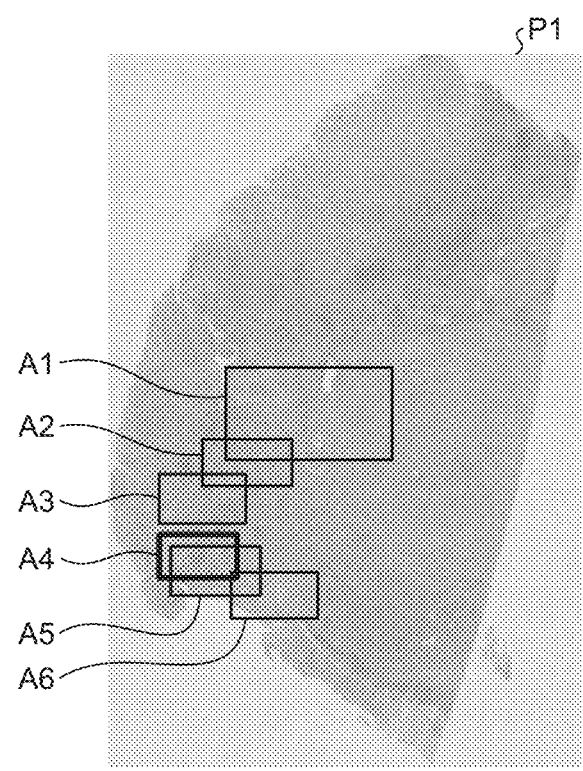
FIG. 4 is a diagram illustrating that fields of view are generated.

Subsequently, the field-of-view generator 11a generates a field of view based on an input of an operation on the input unit 20 (step S2). FIG. 4 is a diagram illustrating that fields of view are generated. As illustrated in FIG. 4, based on inputs of operations on the input unit 20, the field-of-view generator 11a generates fields of view A1 to A6 in the image P1 as the time elapses.

Figure 5:
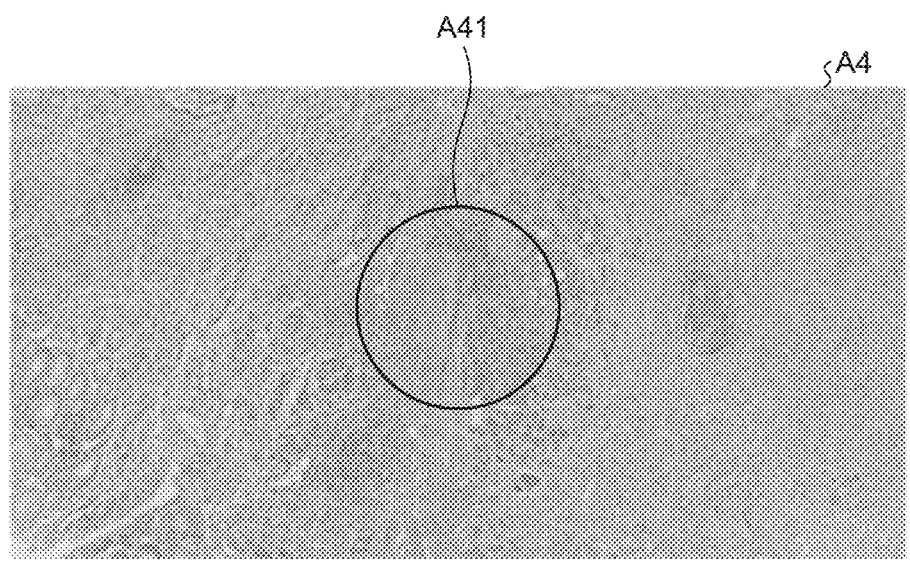
FIG. 5 is a diagram illustrating that a display is caused to display an image corresponding to a field of view.

The display controller 11 then causes the display 30 to display an image corresponding to the field of view and records information on the field of view in the recorder 12 (step S3). FIG. 5 is a diagram illustrating that the display is caused to display an image corresponding to a field of view. As illustrated in FIG. 5, the display controller 11 causes the display 30 to display, for example, an image corresponding to the field A4 that is generated by the field-of-view generator 11a.

Figure 6:
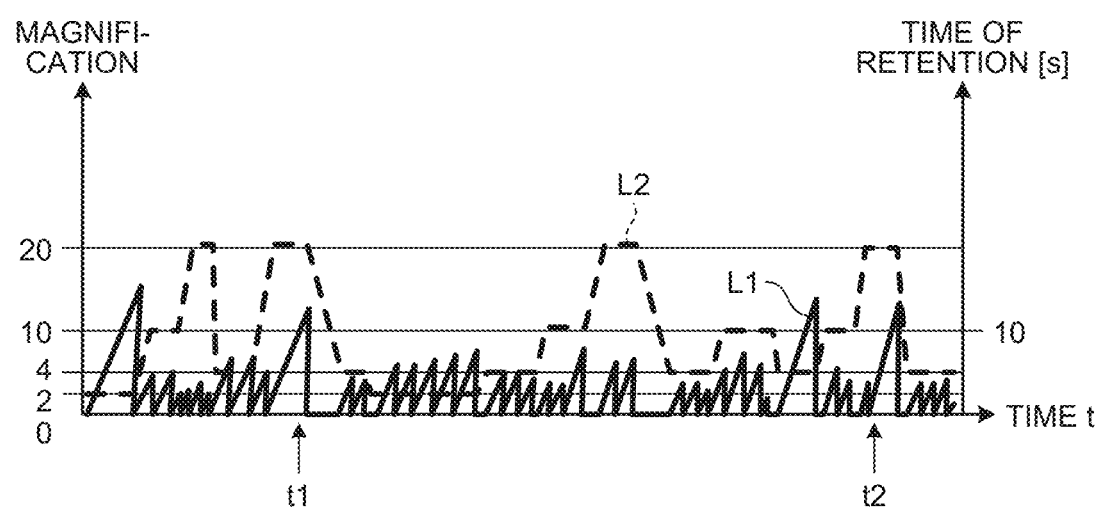
FIG. 6 is a diagram illustrating an example of information on the field of view.

Thereafter, the field-of-view analyzer 13a analyzes change of the field of view over time recorded in the field-of-view recorder 12a of the recorder 12 and calculates an attention degree (step S4). FIG. 6 is a diagram illustrating an example of information on a field of view. The horizontal axis in FIG. 6 represents the time and FIG. 6 presents change of the information on the field of view over time. The vertical axis of the line L1 (solid line) is the time of retention of the field of view. The longer the time in which the field of view is retained in a spot is, the larger the value is. On the other hand, when the user changes the field of view by operating the input unit 20 (the position of observation shifts), the value is reset to zero. The vertical axis of the line L2 (dashed line) represents the magnification of the field of view that is changed between 2× magnification and 20× magnification according to operations of the user on the input unit 20. The field-of-view analyzer 13a calculates an attention degree according to the sum or product of a value that is determined according to the time of retention of the field of view and the value that is determined according to the magnification of the field.

Subsequently, the region-of-interest setting unit 11b sets a region of interest in an image contained in the imaging data according to the attention degree that is calculated by the field-of-view analyzer 13a (step S5). The region-of-interest setting unit 11b sets, for a region of interest, for example, a field of view that is observed by the user when the time of retention of the field of view is 10 seconds or longer and the magnification of the field of view is 10× or larger (the time in FIG. 6 t=t1 and t2). Suppose, for example, that the field of view A4 is set for a region of interest here.

Figure 7:
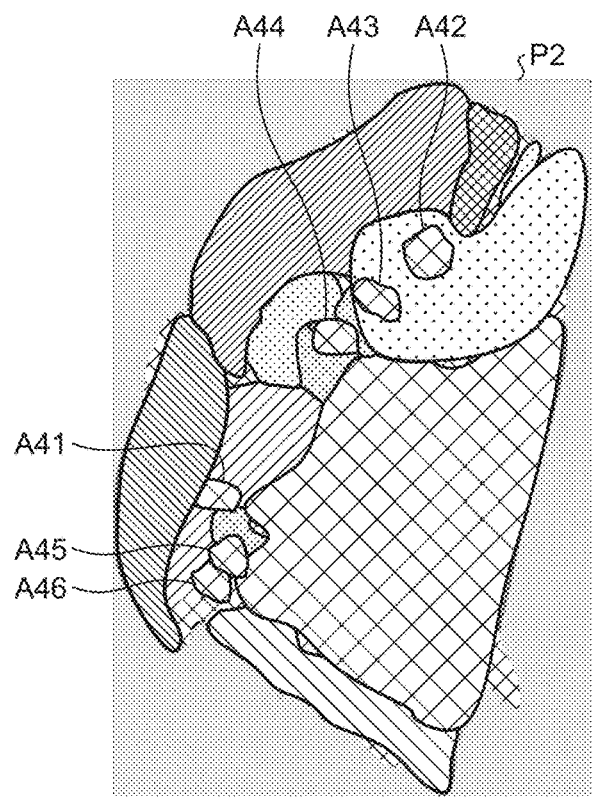
FIG. 7 is a diagram illustrating that a region is segmented according to features.

Thereafter, the feature analyzer 13b calculates features of the field of view A4 that is the region of interest that is set by the region-of-interest setting unit 11b (step S6). Specifically, the feature analyzer 13b calculates a feature of each unit region (for example, pixel) of the image P1 previously and segments the image P1 into regions in each of which features are similar to one another. FIG. 7 is a diagram illustrating that the region is segmented according to the features. As an image P2 illustrated in FIG. 7 presents, the feature analyzer 13b segments the image P1 according to features. The feature analyzer 13b calculates features of the field of view A4 that is the region of interest. The feature analyzer 13b may calculate features of the whole field of view A4 illustrated in FIG. 5 or features of a feature part A41 contained in the field of view A4. The feature part A41 is a region corresponding to one of the regions obtained by segmentation performed by the feature analyzer 13b and in which the features are similar to one another.

Subsequently, based on the features of the field of view A4 that is the region of interest that is calculated by the feature analyzer 13b, the similar region extractor 11c extracts similar regions similar to the region of interest (step S7). Specifically, the similar region extractor 11c extracts regions A42 to A46 having features similar to those of the field of view A4 or the feature part A41 from the regions obtained by segmentation performed by the feature analyzer 13b. Furthermore, the similar region extractor 11c sets, for similar regions, regions containing the regions A42 to A46.

Figure 8:
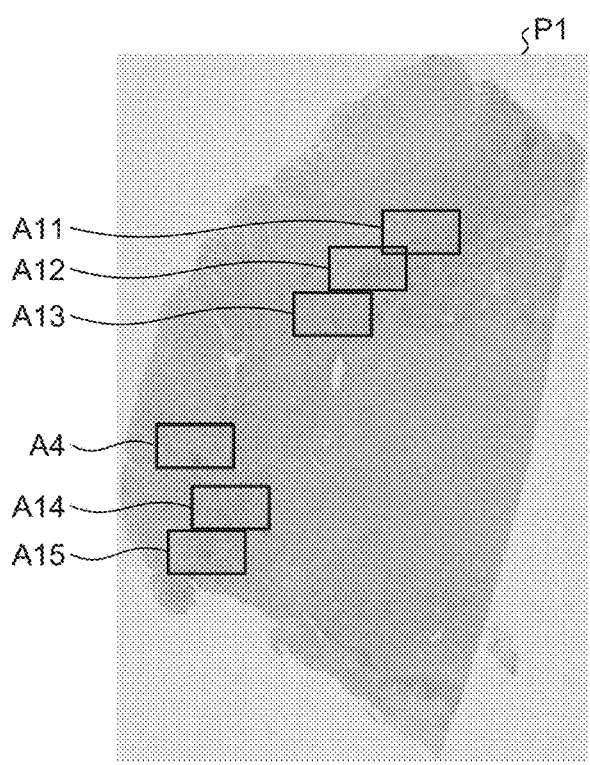
FIG. 8 is a diagram illustrating that fields of view containing similar regions are displayed in an enhanced manner.

According to an input of an operation of the user on the input unit 20, the display controller 11 then causes the display 30 to display the similar regions that are extracted by the similar region extractor 11c (step S8). FIG. 8 is a diagram illustrating that the fields of view containing the similar regions are displayed in an enhanced manner. First of all, as illustrated in FIG. 8, the display controller 11 causes the fields of view A11 to A15 that are similar regions containing the regions A42 to A46, respectively, in an enhanced manner. When the user then performs an operation on the input unit 20 and selects any one of the fields of view A11 to A15, the display controller 11 causes the display 30 to display the selected field of view in an enlarged manner.

Thereafter, when an instruction signal of an instruction to end observation is input from the input unit 20 (YES at step S9), the information processing device 10 ends the process. On the other hand, when the instruction signal of an instruction to end observation is not input from the input unit 20 (NO at step S9), the information processing device 10 returns to step S8 described above and causes the display 30 to display the similar regions corresponding to an operation of the user.

According to the first embodiment described above, based on an attention degree that is determined based on a time of retention of a field of view and a magnification, the region-of-interest setting unit 11b sets a region of interest that is a region on which the user has an interest. As a result, it is possible to accurately perform hands-free determination of a region that the user wants to search for in the imaging data. Furthermore, according to the first embodiment, the similar region extractor 11c extracts similar regions that are similar to the region of interest, thereby enabling extraction of a region similar to a lesion, or the like, that the user wants to search. As a result, it is possible to efficiently make a diagnosis and prevent a lesion from being overlooked.

The above-described first embodiment exemplifies that similar regions similar to a region of interest are extracted; however, embodiments are not limited to this. The display controller 11 may extract a relating region that relates to the region of interest and cause the display 30 to display the relating region. For example, when a lesion corresponding to the region of interest is found, the relating region is a region corresponding to another lesion that is highly likely to be undercurrent in the patient. These lesions can be associated with each other from the cases in the past for their correspondence relationship and recording the correspondence relationship with the feature vales of each lesion in the recorder 12 enables the user to efficiently make a diagnosis on the relating region and prevent the relating region from being overlooked.

According to the first embodiment, because the recorder 12 records a field of view and an attention degree in association with each other in the imaging data, it is possible to easily acquire learning data that is used in machine learning, such as deep learning.

Second Embodiment

A second embodiment of the disclosure will be described. In the above-described first embodiment, a region of interest and similar regions are extracted from imaging data that is input externally. In the second embodiment, a region of interest and similar regions are extracted from imaging data that is stored in a database. A configuration of an information processing system according to the second embodiment will be described and then a process that is executed by an information processing device according to the second embodiment will be described below. The same components as those of the information processing system according to the first embodiment described above are denoted with the same reference numbers and detailed description thereof will be omitted.

Configuration of Information Processing System

Figure 9:
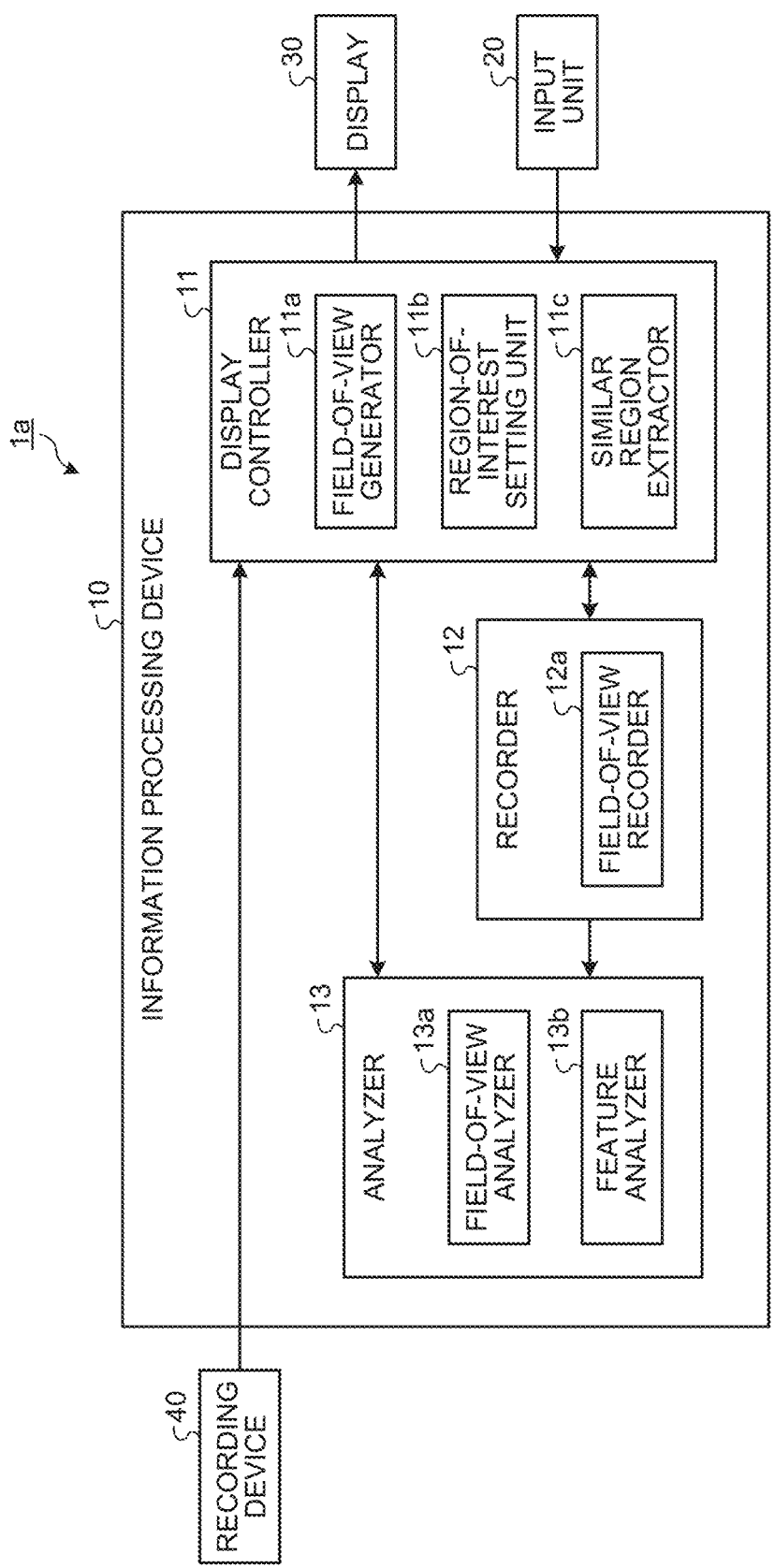
FIG. 9 is a block diagram illustrating a functional configuration of an information processing system according to a second embodiment.

FIG. 9 is a block diagram illustrating a functional configuration of an information processing system according to a second embodiment. An information processing system 1a illustrated in FIG. 9 is connected to a recording device 40.

The recording device 40 is, for example, a server that is connected via an Internet connection. In the recording device 40, a database in which imaging data is stored is constructed.

The region-of-interest setting unit 11b sets a region of interest in the imaging data that is stored in the database of the recording device 40. Similarly, the similar region extractor 11c extracts regions similar to the region of interest from the imaging data that is stored in the database of the recording device 40.

Process Performed by Information Processing Device

Figure 10:
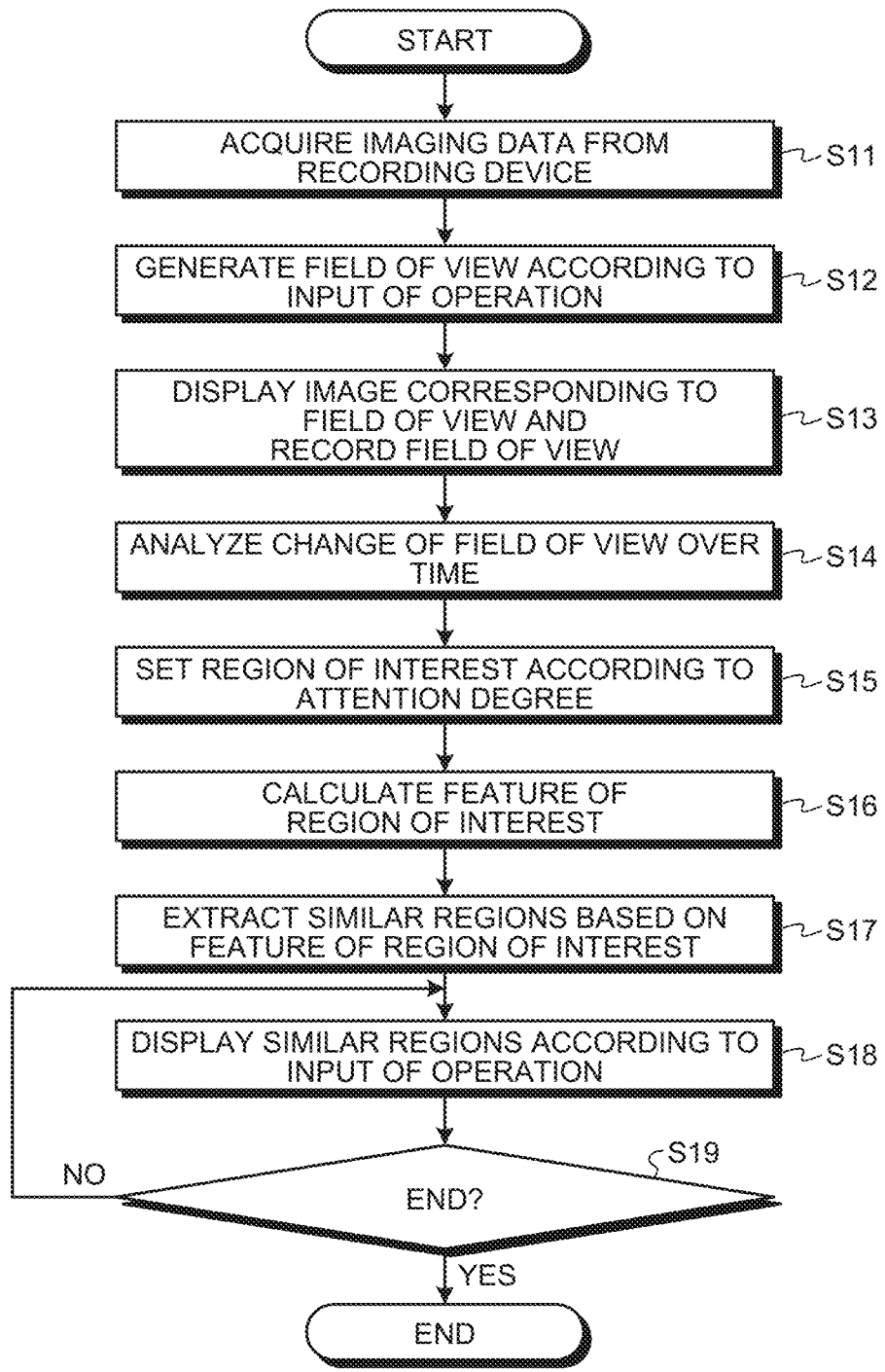
FIG. 10 is a flowchart illustrating an overview of a process that is executed by an information processing device according to a second embodiment.

A process that is executed by the information processing device 10 of the information processing system 1a will be described. FIG. 10 is a flowchart illustrating an overview of the process that is executed by the information processing device according to the second embodiment. As illustrated in FIG. 10, first of all, the information processing device 10 acquires data of an image P1 that is imaging data from the recording device 40 (step S11).

Subsequent steps S12 to S19 correspond respectively to steps S2 to S9 in FIG. 2 described above. Note that, at step S15, the region-of-interest setting unit 11b sets a region of interest in the imaging data that is stored in the database of the recording device 40. At step S17, similarly, the similar region extractor 11c extracts regions that are similar to the region of interest from the imaging data that is stored in the database of the recording device 40.

According to the second embodiment described above, it is possible to accurately perform hands-free determination of a region that the user wants to search for in the imaging data that is captured and stored in the database in advance. Furthermore, according to the second embodiment, in the case where the imaging data that is captured and stored in the database in advance is searched for a lesion, or the like, because an image containing a region similar to a lesion of interest is automatically extracted, it is possible to efficiently make a diagnosis and prevent a lesion from being overlooked.

Third Embodiment

A third embodiment of the disclosure will be described next. The information processing device 10 is used in the first embodiment described above and an information processing device is incorporated in part of a microscope system in the third embodiment. A configuration of a microscope system according to the third embodiment will be described and then a process that is executed by the microscope system according to the third embodiment will be described below. The same components as those of the information processing device 10 according to the above-described first embodiment are denoted with the same reference numbers and detailed description thereof will be omitted as appropriate.

Configuration of Microscope System

Figure 11:
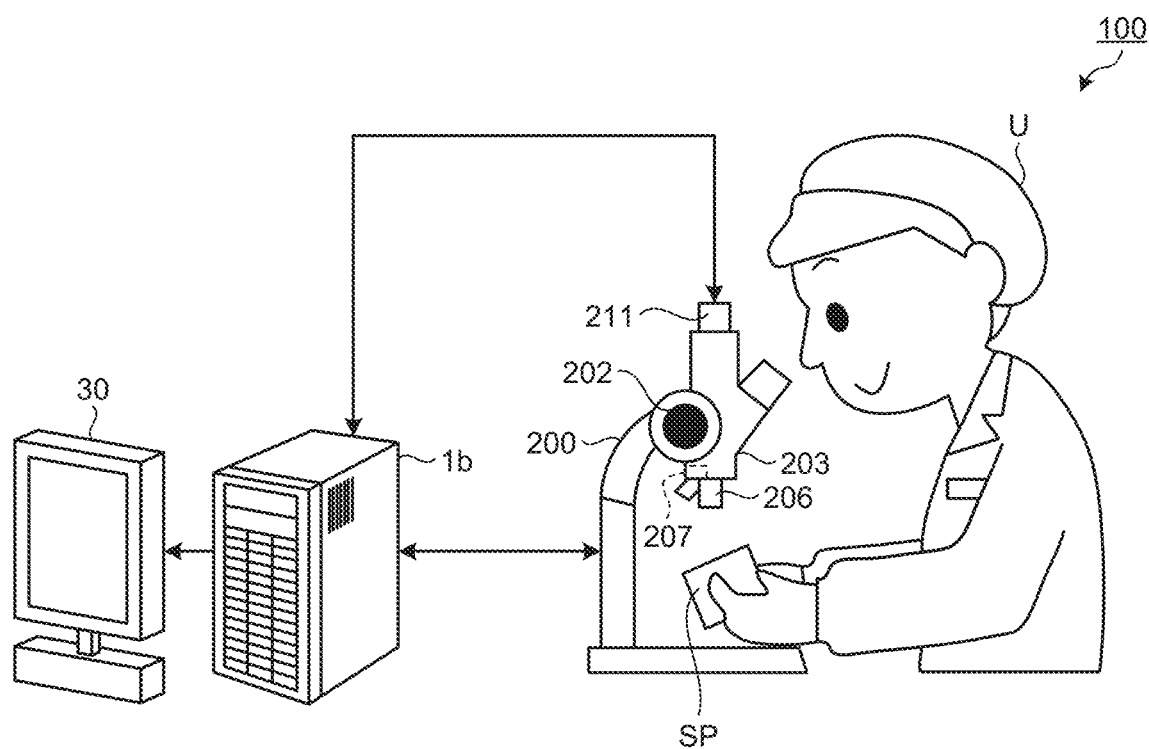
FIG. 11 is a schematic diagram illustrating a configuration of a microscope system according to a third embodiment.
Figure 12:
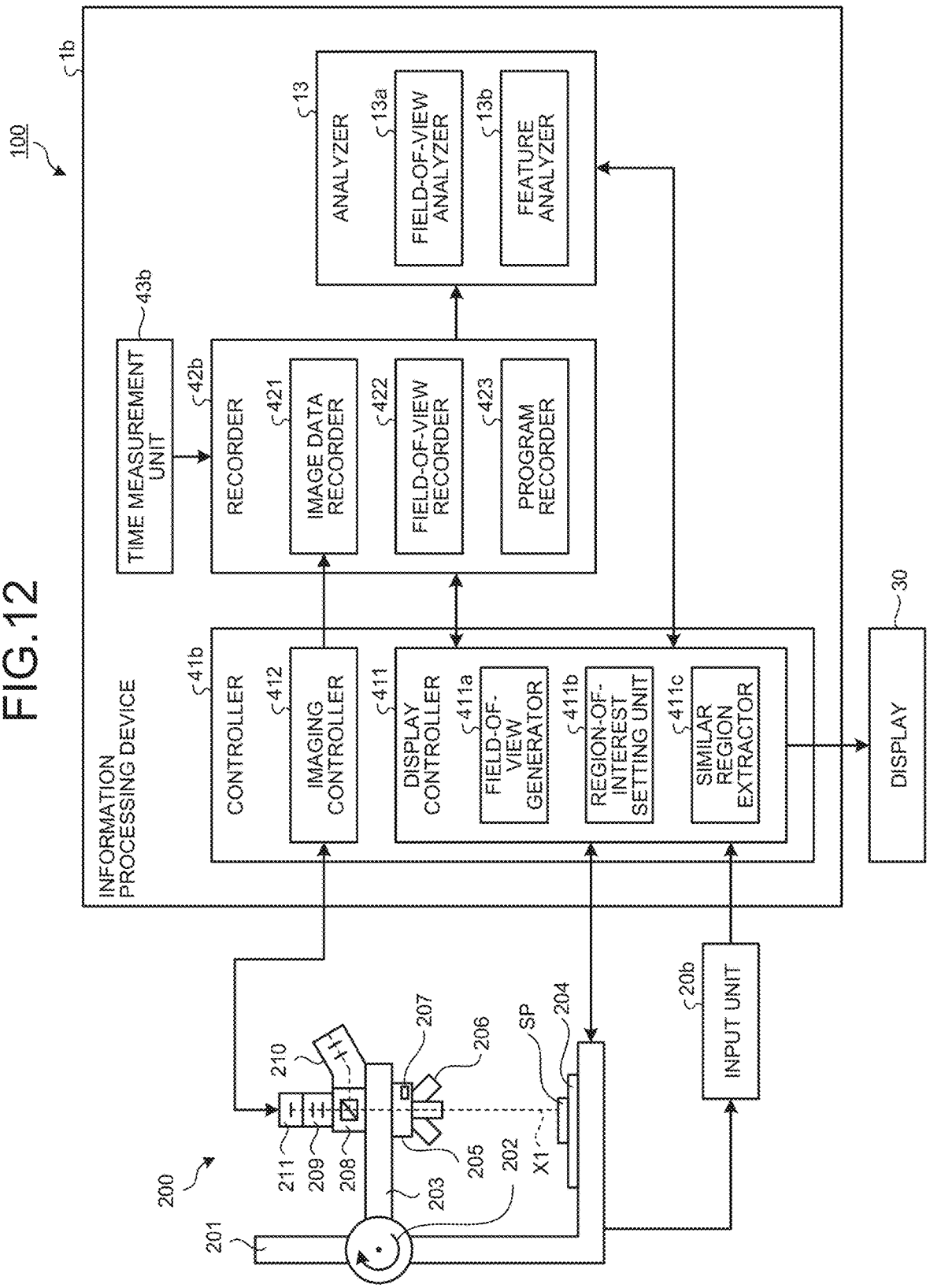
FIG. 12 is a block diagram illustrating a functional configuration of an information processing system according to the third embodiment.

FIG. 11 is a schematic diagram illustrating a configuration of the microscope system according to the third embodiment. FIG. 12 is a block diagram illustrating a functional configuration of the information processing system according to the third embodiment.

As illustrated in FIG. 11 and FIG. 12, a microscope system 100 includes an information processing device 1b, the input unit 20, the display 30, and a microscope 200.

Configuration of Microscope

First of all, a configuration of the microscope 200 will be described.

The microscope 200 includes a body 201, a rotary unit 202, an up-down unit 203, a stage 204, a revolver 205, an objective lens 206, a magnification detector 207, a lens-barrel 208, a connector 209, an eyepiece 210, and an imaging unit 211.

A specimen SP is placed on the body 201. The body 201 is U-shaped and the up-down unit 203 is connected to the body 201 with the rotary unit 202.

The rotary unit 202 rotates according to an operation of a user U, thereby causes the up-down unit 203 to move vertically.

The up-down unit 203 is arranged on the body 201 movably in the vertical direction. The revolver 205 is connected to a surface of the up-down unit 203 on one side and the lens-barrel 208 is connected to a surface of the up-down unit 203 on the other side.

The stage 204 shifts the relative positions of the specimen SP and the objective lens 206 according to an operation of the user U, thereby receiving an operation of changing the field of view.

Multiple objective lenses 206 whose magnifications are different from one another are connected to the revolver 205 and the revolver 205 is connected to the up-down unit 203 rotatably on an optical axis X1. The revolver 205 arranges desired one of the objective lenses 206 on the optical axis X1 according to an operation of the user U. Information indicating a magnification, such as IC chips or labels, is attached to the objective lenses 206. Shapes indicating magnifications other than IC chips and labels may be arranged on the objective lenses 206.

The magnification detector 207 detects the magnification of the objective lens 206 that is arranged on the optical axis X1 and outputs a detection result obtained by the detection to the information processing device 1b. To configure the magnification detector 207, for example, a unit that detects the position of the revolver 205 that switches between the objective lenses is used.

The lens-barrel 208 transmits part of a subject image of the specimen SP that is formed by the objective lens 206 to the connector 209 and reflects the subject image to the eyepiece 210. The lens-barrel 208 includes a prism, a half mirror and a collimating lens inside.

One end of the connector 209 is connected to the lens-barrel 208 and the other end is connected to the imaging unit 211. The connector 209 guides the subject image of the specimen SP that is transmitted through the lens-barrel 208 to the imaging unit 211. To configure the connector 209, a plurality of collimating lenses and a tube lens are used.

The eyepiece 210 guides the subject image that is reflected by the lens-barrel 208 and forms an image. To configure the eyepiece 210, a plurality of collimating lenses and a tube lens are used.

The imaging unit 211 receives the subject image of the specimen SP that is formed by the connector 209, thus generates image data, and outputs the image data to the information processing device 1b. To configure the imaging unit 211, an image sensor, such as a CMOS or a CCD, an image processing engine that performs various types of image processing on the image data, etc., are used.

Configuration of Information Processing Device

A configuration of the information processing device 1b will be described.

The information processing device 1b includes a controller 41b, a recorder 42b and an input unit 20b instead of the display controller 11, the recorder 12 and the input unit 20 of the information processing device 10 according to the first embodiment described above. The information processing device 1b further includes a time measurement unit 43b.

To configure the controller 41b, a CPU, a FPGA, a GPU, etc., are used and the controller 41b controls the display 30 and the imaging unit 211. The controller 41b further includes a display controller 411 and an imaging controller 412.

The display controller 411 controls the mode of display on the display 30. The display controller 411 includes a field-of-view generator 411a, a region-of-interest setting unit 411b, and a similar region extractor 411c.

The field-of-view generator 411a generates a field of view from the image that is captured by the imaging unit 211 based on an input of an operation on the input unit 20b.

The region-of-interest setting unit 411b sets a region of interest in an image that is captured by the imaging unit 211 according to an attention degree that is calculated by the analyzer 13.

The similar region extractor 411c extracts a similar region that is similar to the region of interest in the image that is captured by the imaging unit 211.

The imaging controller 412 controls operations of the imaging unit 211. The imaging controller 412 causes the imaging unit 211 to capture images sequentially according to a predetermined frame rate and thus generate image data. The imaging controller 412 performs predetermined image processing (for example, development processing) on the image data that is input from the imaging unit 211 and outputs the processed image data to the recorder 42b.

To configure the recorder 42b, a volatile memory, a non-volatile memory, a recording medium, etc., are used. The recorder 42b further includes an image data recorder 421, a field-of-view recorder 422, and a program recorder 423.

The image data recorder 421 records the image data that is input from the imaging controller 412 and outputs the image data to the display controller 411.

The field-of-view recorder 422 records information on the field of view that is input from the display controller 411 and the attention degree that is calculated by the analyzer 13 in association with each other.

The program recorder 423 records various programs that are executed by the information processing device 1b, data that is used during execution of the various programs, and data under processing during execution of the various programs.

To configure the time measurement unit 43b, a timer, a clock generator, etc., are used and the time measurement unit 43b adds time information to the image that is captured by the imaging unit 211, the information on the field of view that is generated by the field-of-view generator 411a, etc.

To configure the input unit 20b, a mouse, a keyboard, a touch panel, and various switches are used. The input unit 20b contains the stage 204 that receives an operation of shifting the field of view of the microscope 200 and the revolver 205 that changes the magnification of the microscope 200. The input unit 20b receives inputs of various operations made by the user U containing an operation of changing the field of view of the microscope 200 that is performed by the user U and outputs operation signals corresponding to the received various operations to the information processing device 1b.

Process Performed by Microscope System

Figure 13:
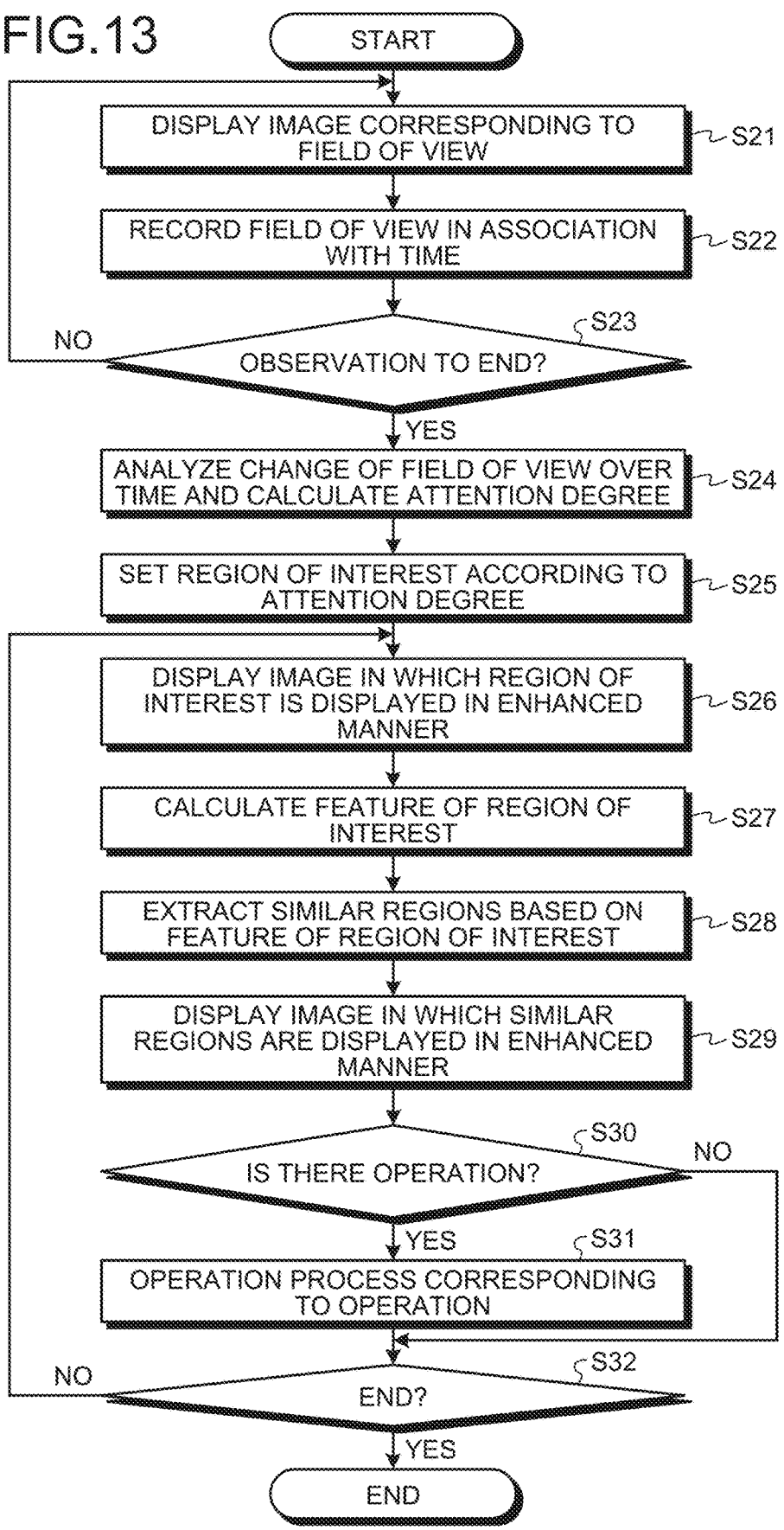
FIG. 13 is a flowchart illustrating an overview of a process that is executed by an information processing device according to the third embodiment.

A process that is executed by the microscope system 100 will be described. FIG. 13 is a flowchart illustrating an overview of a process that is executed by the information processing device according to the third embodiment.

As illustrated in FIG. 13, first of all, the display controller 411 causes the display 30 to display an image corresponding to a field of view that is generated by the field-of-view generator 411a (step S21). The microscope system 100 captures a video corresponding to the field of view and sequentially records the video as imaging data in the recorder 42b.

Furthermore, the display controller 411 records the field of view that is generated by the field-of-view generator 411a in association with a time that is measured by the time measurement unit 43b in the field-of-view recorder 422 (step S22).

When a signal of an instruction to end observing the image that is displayed by the display 30 is input from the input unit 20b (YES at step S23), the microscope system 100 moves to step S24 to be described below. On the other hand, when the signal of the instruction to end observing the image that is displayed by the display 30 is not input from the input unit 20b (NO at step S23), the microscope system 100 returns to step S21.

Figure 14:
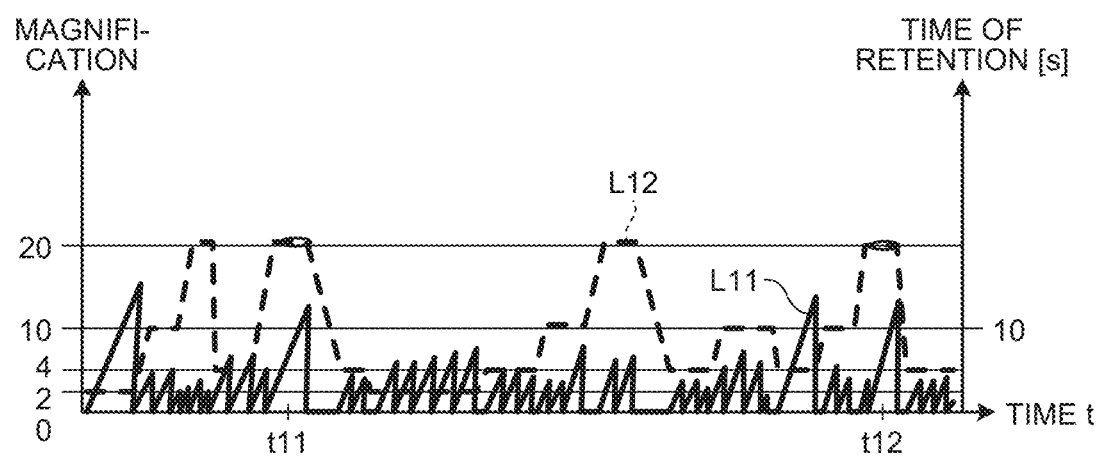
FIG. 14 is a diagram illustrating an example of information on a field of view.

Thereafter, the field-of-view analyzer 13a analyzes change of the field of view that is recorded in the field-of-view recorder 422 of the recorder 42b over time and calculates an attention degree (step S24). FIG. 14 is a diagram illustrating an example of information on a field of view. The horizontal axis represents the time and FIG. 14 presents the change of the information on the field of view over time. The vertical axis of the line (solid line) L11 represents the time of retention of the field of view. The longer the time in which the field of view is retained in a spot is, the larger the value is. On the other hand, when the user changes the field of view by operating the input unit 20b (the position of observation shifts), the value is reset to zero. The vertical line of the line (thick dashed line) L12 represents the magnification of the field of view and is changed between 2× magnification and 20× magnification according to an operation (for example, rotating the revolver 205 to switch the objective lens 206) of the user on the input unit 20b. The field-of-view analyzer 13a calculates an attention degree according to the sum or product of a value that is determined according to the time of retention of the field of view and a value that is determined according to the magnification of the field.

Figure 15:
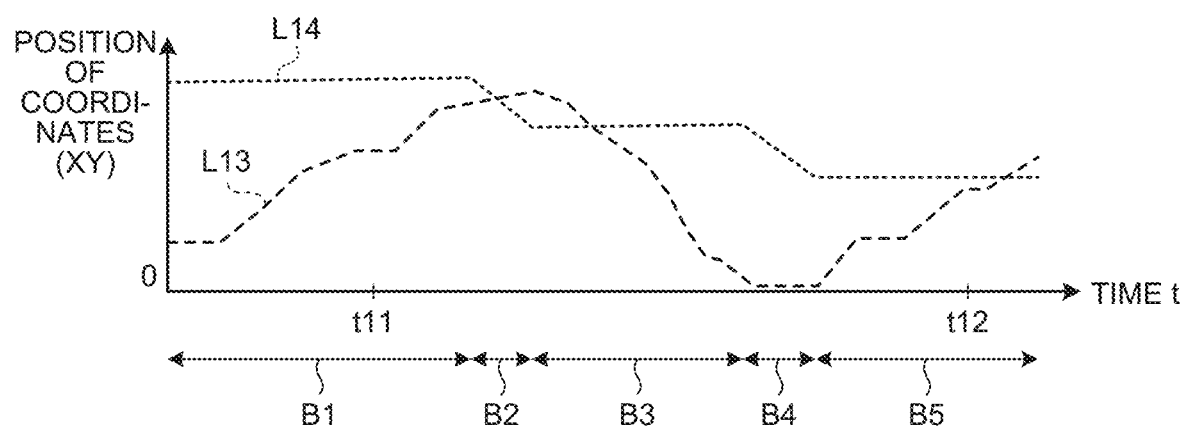
FIG. 15 is a diagram illustrating that the position of coordinates changes.
Figure 16:
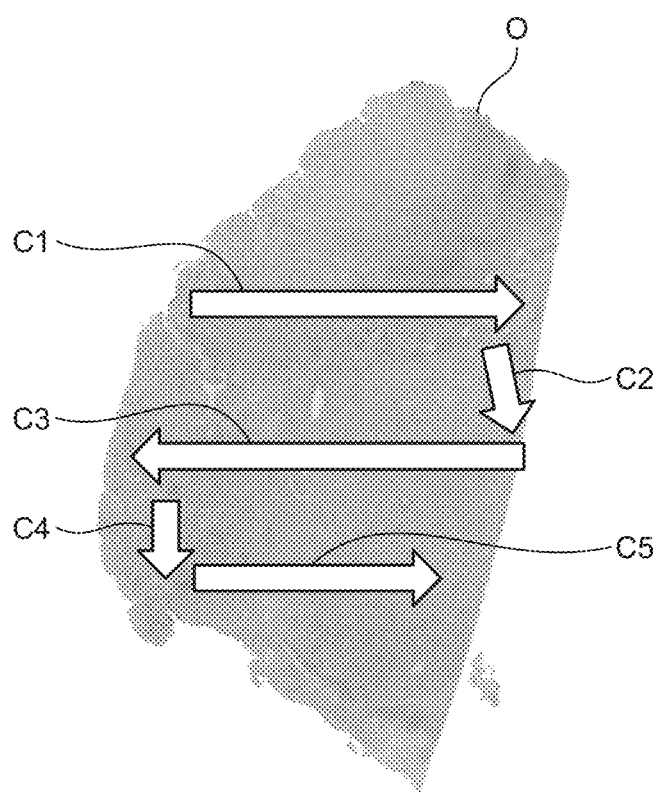
FIG. 16 is a diagram illustrating that the field of view shifts.

FIG. 15 is a diagram illustrating that the position of coordinates change. FIG. 16 is a diagram illustrating that the field of view shifts. In FIG. 15, the horizontal axis represents the time same as FIG. 14 and the vertical axis represents the position of coordinates of the observation. A line (long dashed line) L13 in FIG. 15 represents the position in a x-direction (horizontal direction) and the value increases as the field shifts rightward in FIG. 16. Similarly, A line (short dashed line) L14 represents the coordinate in a y-direction (vertical direction) and the value increases as the field of view shifts upward in FIG. 16. At times B1 to B5 in FIG. 15, the field of view with respect to an observation subject O changes as represented by the arrows C1 to C5 in FIG. 16. The controller 41b controls the position of the stage 204 according to an operation of the user on the input unit 20b and accordingly the position in the x-direction and the position in the y-direction change.

Subsequently, the region-of-interest setting unit 411b sets a region of interest in an image that is contained in the video that is imaging data according to the attention degree that is calculated by the field-of-view analyzer 13a (step S25). The region of interest setting unit 411b sets, for a region of interest, for example, a field of view that is observed by the user when the time of retention of the field of view is 10 seconds or longer and the magnification of the field of view is 10× or larger (the time in FIG. 14 t=t11 and t12).

At step S26, the display controller 411 causes the display 30 to display an image in which the region of interest that is set by the region-of-interest setting unit 411b is displayed in an enhanced manner (step S26).

Thereafter, the feature analyzer 13b calculates features of the region of interest that is set by the region-of-interest setting unit 411b (step S27). As at step S6, the feature analyzer 13b may calculate a feature of each unit region (for example, pixel) of a composite image from the video that is the imaging data and segment the composite image into regions in each of which features are similar to one another.

Subsequently, based on the features of the region of interest that are calculated by the feature analyzer 13b, the similar region extractor 411c extracts similar regions that are similar to the region of interest (step S28). Specifically, the similar region extractor 411c extracts similar regions from the composite image, the similar regions being regions having features similar to those of the region of interest.

The display controller 411 causes the display 30 to display an image in which the similar regions that are extracted by the similar region extractor 411c in an enhanced manner, for example, by enhancement lines (step S29).

When any one of the similar regions with the enhancement lines is operated by the input unit 20b (YES at step S30), the controller 41b executes an operation process corresponding to the operation (step S31). Specifically, the display controller 411 causes the display 30 to display in an enlarged manner a similar region with the enhancement line that is selected by the input unit 20b. After step S31, the microscope system 100 moves to step S32 described below.

At step S30, when any one of the similar regions with the enhancement lines is not operated by the input unit 20b (NO at step S30), the microscope system 100 moves to step S32.

At step S32, when an instruction signal of an instruction to end observation is input from the input unit 20b (YES at step S32), the microscope system 100 ends the process. On the other hand, when the instruction signal of an instruction to end observation is not input from the input unit 20b (NO at step S32), the microscope system 100 returns to step S26 described above.

According to the third embodiment described above, it is possible to, based on an attention degree, set a region of interest in a video that is captured by the microscope system 100, observe similar regions similar to the region of interest efficiently, and prevent a lesion, etc., from being overlooked.

Other Embodiments

It is possible to form various embodiments by appropriately combining multiple components disclosed in the above-described first to third embodiments. For example, some components may be omitted from all the components described in the first to third embodiments described above. Components described in the first to third embodiments described above may be combined appropriately.

In the first to third embodiments, "unit", "-er" and "-or" described herein may be read as "means", "circuitry", or the like. For example, the controller may be read as a control means or a control circuitry.

The programs that the information processing devices according to the first to third embodiments are caused to execute are recorded as installable or executable file data in a computer-readable recording medium, such as a CD-ROM, a flexible disk (FD), a CD-R, a digital versatile disk (DVD), a USB medium, or a flash memory, and are provided.

The programs that the information processing devices according to the first to third embodiments are caused to execute may be stored in a computer that is connected to a network, such as the Internet, and may be configured to be downloaded via the network and thus be provided. Furthermore, the programs that the information processing devices according to the first to third embodiments are caused to execute may be provided or distributed via a network, such as the Internet.

In the first to third embodiments, signals are transmitted from various devices via transmission cables. For example, it need not be wired transmission and it may be wireless transmission. In this case, signals may be transmitted from each device according to given wireless communication standards (for example, Wi-Fi (trademark) or Bluetooth (trademark)). Needless to say, wireless communication may be performed according to other wireless communication standards.

In the description of the flowcharts herein, the context of the process among steps is clearly specified using expressions including "first of all", "thereafter", and "subsequently"; however, the order of the processes necessary to implement the disclosure is not uniquely determined by those expressions. In other words, the order of processes in the flowcharts described herein is changeable within a range without inconsistency.

According to the disclosure, it is possible to achieve an information processing device, an information processing method, and a program that enable hands-free accurate determination of a region that a user wants to search for in an image.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing device comprising:
   a processor comprising hardware, the processor being configured to:
      cause a display to display part of a whole slide image according to an operation input that includes an instruction input for determining a location and a size of a field of view as an area of the whole slide image that a user desires to observe, the whole slide image being contained in imaging data that is generated by capturing an observation subject, the whole slide image being one image that is generated by capturing an image of a whole slide sample as the observation subject, the part corresponding to the field of view determined by the operation input;
      analyze change of the field of view over time that changes in response to the operation input, using information on the location and a magnification of the field of view, to calculate an attention degree, the magnification of the field of view being a ratio at which the part of the whole slide image is enlarged as the field of view with respect to the whole slide image; and
      set a region of interest in the whole slide image contained in the imaging data according to the attention degree.

2. The information processing device according to claim 1, wherein the attention degree increases as a magnification of display of the field of view on the display increases.

3. The information processing device according to claim 1, the processor is further configured to extract a region similar to the region of interest from the whole slide image that is contained in the imaging data.

4. The information processing device according to claim 1, wherein the imaging data is one image that is generated by capturing the observation subject.

5. The information processing device according to claim 1, wherein the imaging data is a video that is generated by capturing the observation subject.

6. The information processing device according to claim 1, wherein the processor is further configured to set the region of interest in the whole slide image that is contained in the imaging data that is stored in a database.

7. The information processing device according to claim 1, wherein the attention degree is calculated according to a sum or product of a value that is determined according to a time of retention of the field of view and a value that is determined according to the magnification of the field of view.

8. An information processing method that is executed by an information processing device, the information processing method comprising:
   displaying a part of a whole slide image on a display according to an operation input that includes an instruction input for determining a location and a size of a field of view as an area of the whole slide image that a user desires to observe, the whole slide image being contained in imaging data that is generated by capturing an observation subject, the whole slide image being one image that is generated by capturing an image of a whole slide sample as the observation subject, the part corresponding to the field of view determined by the operation input;
   analyzing change of the field of view over time that changes in response to the operation input, using information on the location and a magnification of the field of view, to calculate an attention degree, the magnification of the field of view being a ratio at which the part of the whole slide image is enlarged as the field of view with respect to the whole slide image; and
   setting a region of interest in the whole slide image contained in the imaging data according to the attention degree.

9. A non-transitory computer-readable recording medium with an executable program stored thereon, wherein the program, when executed, causes an information processing device to:
   display part of a whole slide image on a display according to an operation input that includes an instruction input for determining a location and a size of a field of view as an area of the whole slide image that a user desires to observe, the whole slide image being contained in imaging data that is generated by capturing an observation subject, the whole slide image being one image that is generated by capturing an image of a whole slide sample as the observation subject, the part corresponding to the field of view determined by the operation input;
   analyze change of the field of view over time that changes in response to the operation input, using information on the location and a magnification of the field of view to calculate an attention degree, the magnification of the field of view being a ratio at which the part of the whole slide image is enlarged as the field of view with respect to the whole slide image; and
   set a region of interest in the whole slide image contained in the imaging data according to the attention degree.

10. An information processing device comprising:
    a processor comprising hardware, the processor being configured to:
       cause a display to display a second image according to an operation input, the second image corresponding to a field of view corresponding to at least part of a first image contained in imaging data that is generated by capturing an observation subject, the imaging data being a video that is generated by recording an observation image of a specimen using a microscope, the operation input including an instruction input for operating at least one of a location and a magnification of the field of view for specimen observation using the microscope, the second image being an image of the field of view observed using the microscope;

analyze change of the field of view over time that changes in response to the operation input, using information on the location and the magnification of the field of view, to calculate an attention degree; and set a region of interest in the first image contained in the imaging data according to the attention degree.

11. The information processing device according to claim 10, wherein the attention degree is calculated according to a sum or product of a value that is determined according to a time of retention of the field of view and a value that is determined according to the magnification of the field of view.

12. An information processing method that is executed by an information processing device, the information processing method comprising:

displaying a second image on a display according to an operation input, the second image corresponding to a field of view corresponding to at least part of a first image contained in imaging data that is generated by capturing an observation subject, the imaging data being a video that is generated by recording an observation image of a specimen using a microscope, the operation input including an instruction input for operating at least one of a location and a magnification of the field of view for specimen observation using the microscope, the second image being an image of the field of view observed using the microscope;

analyzing change of the field of view over time that changes in response to the operation input, using information on the location and the magnification of the field of view, to calculate an attention degree, to calculate an attention degree; and setting a region of interest in the first image contained in the imaging data according to the attention degree.

13. A non-transitory computer-readable recording medium with an executable program stored thereon, the program, when executed, causes an information processing device to:

display a second image on a display according to an operation input, the second image corresponding to a field of view corresponding to at least part of a first image contained in imaging data that is generated by capturing an observation subject, the imaging data being a video that is generated by recording an observation image of a specimen using a microscope, the operation input including an instruction input for operating at least one of a location and a magnification of the field of view for specimen observation using the microscope, the second image being an image of the field of view observed using the microscope;

analyze change of the field of view over time that changes in response to the operation input, using information on the location and the magnification of the field of view, to calculate an attention degree, to calculate an attention degree; and set a region of interest in the first image contained in the imaging data according to the attention degree.

14. An information processing device comprising a processor and being connectable to a microscope, the processor comprising hardware, the processor being configured to:

acquire data regarding an image of an observation subject via the microscope;

acquire information about a position of a field of view of the image, and information about a magnification of the image;

analyze chronological change of the field of view according to at least one of the position of the field of view and the magnification;

calculate an attention degree according to the chronological change; and set, as a region of interest, the field of view having the attention degree greater than or equal to a threshold, wherein the attention degree is calculated according to a sum or product of a value that is determined according to a time of retention of the field of view and a value that is determined according to a magnification of the field of view.

15. An information processing method that is executed by an information processing device, the information processing method comprising:

acquiring data regarding an image of an observation subject via a microscope;

acquiring information about a position of a field of view of the image, and information about a magnification of the image;

analyzing chronological change of the field of view according to at least one of the position of the field of view and the magnification;

calculating an attention degree according to the chronological change; and setting, as a region of interest, the field of view having the attention degree greater than or equal to a threshold, wherein the attention degree is calculated according to a sum or product of a value that is determined according to a time of retention of the field of view and a value that is determined according to a magnification of the field of view.

16. A non-transitory computer-readable recording medium with an executable program stored thereon, the program, when executed, causes an information processing device to:

acquire data regarding an image of an observation subject via a microscope;

acquire information about a position of a field of view of the image, and information about a magnification of the image;

analyze chronological change of the field of view according to at least one of the position of the field of view and the magnification;

calculate an attention degree according to the chronological change; and set, as a region of interest, the field of view having the attention degree greater than or equal to a threshold, wherein the attention degree is calculated according to a sum or product of a value that is determined according to a time of retention of the field of view and a value that is determined according to a magnification of the field of view.

* * * * *